July 21, 1942. N. P. CASE Re. 22,139

ADJUSTABLE INDUCTANCE

Original Filed March 31, 1937

INVENTOR.
NELSON P. CASE
BY Laurence B. Dodds
ATTORNEY.

Reissued July 21, 1942

Re. 22,139

UNITED STATES PATENT OFFICE 22,139

ADJUSTABLE INDUCTANCE

Nelson P. Case, Great Neck, N. Y., assignor to Haseltine Corporation, a corporation of Delaware Original No. 2,173,084, dated September 19, 1939, Serial No. 134,069, March 31, 1937. Application for reissue June 27, 1941, Serial No. 400,153

20 Claims. (Cl. 171—242)

Figure 1:
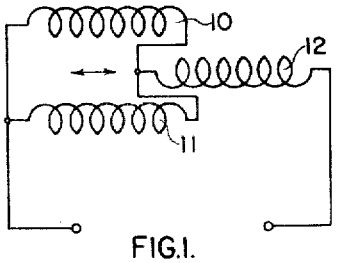

This invention relates to adjustable inductance units which, while of general application, are especially adapted for use as tuning elements in the resonant circuits of a high-frequency signaling system for tuning the circuits over broad bands of frequencies.

In high-frequency signaling systems, it is generally desirable to maintain the antiresonant impedances of the resonant circuits at or near their maximum values as they are tuned over their respective ranges of frequencies in order that high gain may be obtained under all conditions. When an adjustable condenser is utilized as a tuning element of a tunable circuit, its capacitance becomes so large at the low-frequency end of the tuning range that the L/C ratio and the antiresonant impedance of the circuit, and hence the gain, are appreciably reduced. However, if fixed condensers and adjustable inductance tuning elements are utilized in such resonant circuits, a high antiresonant impedance may be obtained over the entire tuning range.

Adjustable inductance units heretofore devised have been subject to various objections. In general, these units have been either of the type comprising fixed windings and an associated adjustable shield or of the well-known adjustable winding variometer type. Both of these types ordinarily are objectionable in that they have relatively small ranges of inductance variation and the shield type also has relatively high power factors. While units of the variometer type have usually been the least objectionable in these respects, even they ordinarily have a relatively limited range of variation. For an adjustable reactance element suitable for tuning over a wide frequency range, such as the broadcast band, a variation of approximately 9:1 is required. Further, in conventional inductance units of the variometer type, very close spacing between windings is required for units of moderate inductance and moderate dimensions, giving a large variation of distributed capacitance and limiting the tuning range when such unit is used as a tuning element of a resonant circuit. Moreover, inductance units of the variometer type heretofore devised have been relatively complicated and otherwise mechanically objectionable.

It is an object of the present invention, therefore, to provide a novel and improved adjustable inductance unit having a wide range of inductance variation.

It is a further object of the invention to provide an adjustable inductance unit of the type described having one or more of the following characteristics: simplicity, compactness, ruggedness, and ease of operation.

In accordance with the present invention, there is provided a composite adjustable inductance unit which comprises a first substantially cylindrical winding means providing a first magnetic field of predetermined shape, intensity, and polarity. A second substantially cylindrical winding means, interleaving with said first winding means and having a mean diameter equal to that of said first winding means, is arranged to provide a second magnetic field coaxial with, of substantially the same shape and intensity as, but of an opposite polarity to, that of the first-mentioned winding means. An adjusting means is provided for moving the two winding means with respect to each other. This relative movement is preferably from a first position, in which the two magnetic fields are substantially mutually exclusive and a maximum inductance is provided by the unit, to a second position, in which the fields are substantially coincident, so that the field of the second winding means substantially neutralizes or cancels the field of the first-mentioned winding means and a minimum inductance of a relatively small value is provided by the unit.

In one approved embodiment of the invention, three windings are individually disposed on three coaxial cylindrical forms. These forms are dimensioned for telescopic movement, one within the other two. The windings are so proportioned and arranged that the two windings on the outer and inner forms provide a first magnetic field as described above, and the winding on the intermediate form provides the second magnetic field. Preferably, the outer and inner forms are secured in relatively fixed telescopic relation, and means are provided operatively interconnecting a control element and the intermediate form so that equal adjustments of the control element over its range effect different displacements of the intermediate form relative to the outer and inner forms to vary the total inductance of the unit as described above. This manner of control renders the unit especially adaptable for use as a tuning element, in that equal adjustments of the control element may be made to effect equal variations in the resonant frequency of a circuit in which the unit is used as a tuning element.

As used in this specification, the term "mean diameter" is used to denote the effective diameter for purposes of inductance computation of winding systems to which the term is applied, and thus it may apply to a single layer winding, a multilayer winding, or a multiwinding system.

Also as used in this specification, the term "cylindrical winding" is intended to include windings, sometimes referred to as solenoids, and having any desired ratio of length to depth of winding.

For a better understanding of the invention, together with other and further objects thereof, reference is had to the following description taken in connection with the accompanying drawing and its scope will be pointed out in the appended claims.

Figure 2:
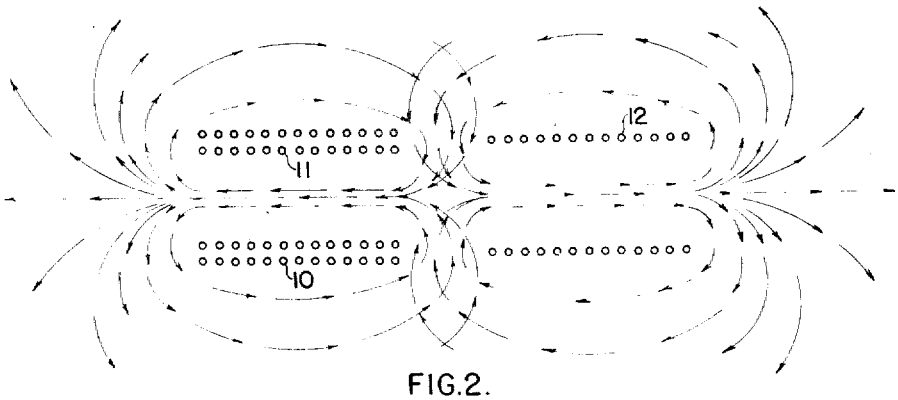

In the accompanying drawing, Fig. 1 is a simplified circuit diagram illustrating one approved form of the present invention; Fig. 2 is a longitudinal sectional view of the windings of an inductance unit such as is illustrated in Fig. 1, indicating the magnetic fields produced by the windings; Figs. 3, 4, 5, and 6 are circuit diagrams illustrating various modified forms of the present invention; and Fig. 7 is a side elevation of a composite coupling unit embodying the present invention with certain portions shown in longitudinal section and certain portions broken away.

Referring in detail to Figs. 1 and 2, the inductance unit of the present invention illustrated by these figures comprises a pair of coaxial helical windings 10 and 11, disposed one within the other with an annular space therebetween, and an additional helical winding 12 coaxial with, and adapted to be telescoped within the annular space between, the windings 10 and 11, the windings 10 and 11 and the winding 12 thus being interleaving. The cross sections of the windings may, of course, be of any desired shape other than circular, as shown. The radial dimension of the annular space between the windings 10 and 11 is preferably a small fraction of the mean diameter of the windings so that the magnetic field produced jointly by the two windings 10 and 11 is of substantially the same shape and intensity as that produced by the single winding 12. For this purpose also, it is preferable that the diameter of the wire used for the windings 10 and 11 be small relative to the mean diameter of the windings. The winding 12 is thus movable relative to the first winding means, comprising windings 10 and 11, so that at least portions thereof have a substantial axial component of movement with reference to the axis of the first winding means.

In the arrangement of Fig. 1, the winding 12 is wound in a direction opposite to that of the windings 10 and 11 so that the polarity of the field of the winding 12 is opposite to that of the field of the other two windings. The windings 10 and 11 are connected in parallel and the winding 12 is connected in series therewith. The three windings are so proportioned as to have substantially equal inductances so that the current through the winding 12 divides equally between the windings 10 and 11. By virtue of this arrangement, as illustrated in Fig. 2, the windings 10 and 11 jointly provide a first magnetic field of a predetermined shape, intensity, and polarity, while the winding 12 provides a second magnetic field of substantially the same shape and intensity as, but of an opposite polarity to, that of the first field. As indicated by the arrow in Fig. 1, the winding 12 is rectilinearly or axially movable relative to the windings 10 and 11 from a first position external to these windings, in which the two fields are substantially mutually exclusive, to a second position telescopically interposed between the windings 10 and 11, in which the two fields are substantially coincident.

The inductance of the unit described above may be determined according to the formula:

$$L=\frac{L_1L_2}{L_1+L_2}+\frac{M_1}{2}+L_3-2M_2 \qquad (1)$$

where L is the total inductance of the unit; $L_1$, $L_2$, and $L_3$ are the self-inductances of the windings 10, 11, and 12, respectively; $M_1$ is the mutual inductance between the windings 10 and 11; and $M_2$ is the mutual inductance between the pair of windings 10 and 11 and the winding 12. The dimensions of the unit are so related that the maximum value of $2M_2$ approaches that of the expression—

$$\frac{L_1L_2}{L_1+L_2}+\frac{M_1}{2}+L_3 \qquad (2)$$

as closely as possible.

It will thus be seen that, with the winding 12 disposed in the position in which the two fields are substantially mutually exclusive, there is substantially no mutual inductance between the winding 12 and the windings 10 and 11, the value of $M_2$ is inappreciable or substantially zero. In this position, therefore, the total inductance of the unit is a maximum. On the other hand, when the winding 12 is disposed in the second-mentioned position with the two fields substantially coincident, the mutual inductance $M_2$ between the winding 12 and the windings 10 and 11 is a maximum and the total inductance of the unit is reduced to a minimum.

It will be noted that, in the arrangement of Fig. 1, the high potential end of the winding 12 is adjacent the high potential ends of the windings 10 and 11 when the winding 12 is disposed within the other two windings. By virtue of this arrangement, the differences in potential of adjacent portions of the winding 12 and the other two windings is fairly small for all adjustments thereof and the variation of distributed capacitance between these windings has only a small effect on the characteristics of the unit. Care should be taken that the power factors and impedances of the windings 10 and 11 are substantially equal at all frequencies at which the unit is to be operated so that the current through the two windings will be substantially equal under all conditions.

Figure 3:
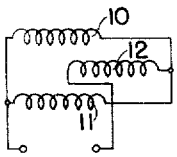

In Fig. 3 there is illustrated a modified form of the invention which is identical with that shown in Fig. 1, except that all three of the windings are wound in the same direction and the difference in polarities of the two fields is obtained by reversing the connections of the winding 12. While, in certain cases, substantially satisfactory results may be obtained with this arrangement, when the windings are completely telescoped, the low potential end of winding 12 is opposite to the high potential ends of the other two windings, so that the distributed capacitance therebetween is somewhat more effective than in the embodiment of Fig. 1.

Figure 4:
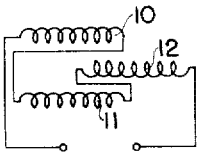
Figure 5:
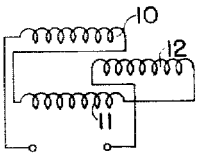

In Figs. 4 and 5 two additional modified forms of the invention are illustrated which are similar to the embodiments of Figs. 1 and 3, respectively, except that all three of the windings are connected in series and the several windings are of correspondingly different relative proportions. In Fig. 4 the difference in polarity of the two fields is obtained, as in Fig. 1, by winding the element oppositely to the windings 10 and 11. In Fig. 5, on the other hand, the difference in polarity is obtained, as in Fig. 3, by reversing the connections of the winding 12. In the embodiments of both Figs. 4 and 5, since all of the windings are connected in series, the total inductance provided by the unit may be according to the formula:

$$L=L_1+L_2+2M_1+L_3-2M_2 \qquad (3)$$

in which corresponding terms represent the same factors as in Equation (1). In the embodiments of Figs. 4 and 5, also, the inductances of the windings 10 and 11 individually are preferably substantially equal, but, since the total inductance of these winding, $L_1+L_2+2M_1$, is approximately $4L_1$, the total inductance of the unit is $$4L_1+L_3-2M_2$$

Therefore, it is necessary that the inductance of the winding 12 be approximately four times that of each of the windings 10 and 11 in order that the total inductance may be reduced to approximately zero when the two fields are substantially coincident or $M_2$ is at its greatest value.

Figure 6:
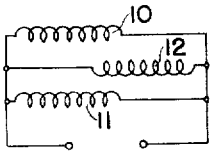
Figure 7:
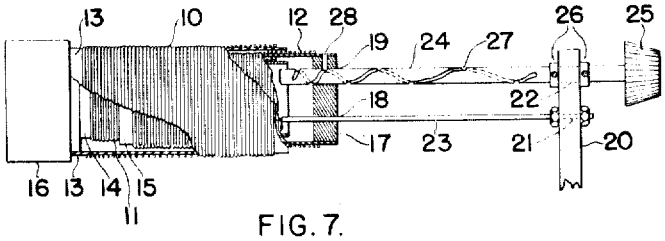

In Fig. 6 still another modified form of the invention is illustrated. Here, the three windings are all connected in parallel with the winding 12 wound in a direction opposite to that of the windings 10 and 11 in order to obtain the desired difference in polarity of the two fields. In this case, the winding 12 preferably has a self-inductance approximately equal to that of each of the windings 10 and 11 in order that the total inductance of the unit may be varied from its maximum value to a minimum value of approximately zero.

The inductance of the unit of Fig. 6 may be determined according to the formula:

$$L=\frac{\left(\frac{L_1L_2}{L_1+L_2}+\frac{M_1}{2}\right)L_3}{\frac{L_1L_2}{L_1+L_2}+\frac{M_1}{2}+L_3}-\frac{M_2}{2} \qquad (4)$$

in which corresponding terms respresent the same factors as in the other equations.

If then, $L_1=L_2=L_3=M_1=M_2=L_1$ where unity coupling between $L_1$ and $L_2$ is assumed, then for the minimum total inductance of the unit the following equation holds:

$$L\ \text{min.}=\frac{\left(\frac{L'^2}{2L'}+\frac{L'}{2}\right)L'}{\frac{L'^2}{2L'}+\frac{L'}{2}+L'}-\frac{L'}{2}=\frac{L'^2}{2L'}-\frac{L'}{2}=0 \qquad (5)$$

and for the maximum total inductance for the unit, where $M_2=0$, the following equation holds:

$$L\ \text{max.}=\frac{L'^2}{2L'}-M_2=\frac{L'}{2} \qquad (6)$$

It will be noted that this embodiment has the special advantage that the effect of the distributed capacitance is reduced to a minimum, since, when the windings are completely telescoped, there is no difference in potentials between adjacent parts of the windings.

Referring to Fig. 7, there is illustrated a physical construction of an inductance unit embodying the present invention. This unit comprises three coaxial cylindrical forms 13, 14, and 15 on which are disposed the windings 10, 11, and 12, respectively. The form 14 is disposed within the form 13, leaving an annular space therebetween and these two forms are rigidly secured to a suitable base 16, as shown. The form 15 is of a diameter intermediate between the diameters of the forms 13 and 14 and is adapted to be telescoped therebetween. An end piece 17 is secured to the end of the form 15 remote from the base 16 and is provided with guide passages 18 and 19. There is also provided a fixed support 20 having transverse openings 21 and 22 corresponding to the openings 18 and 19, respectively, in the end piece 17. A guide rod 23 is rigidly secured in the opening 21 parallel to the common axis of the forms and extends through the passage 18 to prevent rotation of the form 15 while guiding axial movements thereof. A shaft 24 extends through the opening 22 and passage 19 and is provided with a suitable actuating knob 25 and annular collars 26 to prevent longitudinal movement thereof. A spiral screw thread 27, of a pitch gradually increasing in the direction of the support 20, is formed in the shaft 24 and engages a pin 28 in the end piece 17. This shaft and pin arrangement thus provides a nonuniform motion-transmitting means connecting the control element or knob 25 and the intermediate form. The windings 10, 11, and 12 may be proportioned, arranged, and connected in accordance with the embodiments illustrated in any of Figs. 1, 3, 4, 5 or 6.

In the operation of the inductance unit of Fig. 7 to adjust the inductance thereof, the knob 25 is rotated to rotate the shaft 24 and, because of the engagement of the pin 28 in the screw thread 27, the form 15 is axially moved relative to the forms 13 and 14. The limits of movement of the form 15 are from its innermost position where the fields developed by the windings are substantially coincident and the total inductance of the unit is a minimum, to a position external to the forms 13 and 14 where the magnetic fields in question are substantially mutually exclusive and the total inductance of the unit is a maximum. The forms are so proportioned that the radial dimension of the annular space between the forms 13 and 14 is a small fraction of the mean diameters of these forms. By virtue of this arrangement, the magnetic fields produced jointly by the windings on these two forms is of substantially the same shape and intensity as that produced by the winding on the form 15 and when the form 15 is telescopically moved to its position between the other forms, the two fields are substantially coincident. It will be apparent that this result is not obtainable by a unit including only two telescopically engaging windings since, inasmuch as one of such windings must have a lesser diameter than the other in order to obtain telescopic engagement, the two fields will necessarily be of different shapes rendering coincident positioning thereof impossible. Due to the variation in the pitch of the screw thread 27, equal adjustments of the knob 25 from the first to the second extreme positions mentioned above effect gradually increasing adjustments of the winding 12. A unit of the type described is especially well adapted for use as a tuning element in a resonant circuit since, with the pitch of the screw thread varying in a proper manner, equal adjustments of the knob 25 effect the proper adjustments of the total inductance of the unit to impart to the unit a straight-line frequency characteristic over its entire tuning range.

While there have been described what are at present considered the preferred embodiments of this invention, it will be obvious to those skilled in the art that various changes and modifications may be made therein without departing from this invention, including various other manners of connecting and positioning the windings of the unit in addition to those described in detail, and, therefore, it is aimed in the appended claims to cover all such changes and modifications as fall within the true spirit and scope of this invention.

What is claimed is:

1. A composite adjustable inductance unit comprising a first substantially cylindrical winding means providing a magnetic field of predetermined shape, intensity, and polarity, a second substantially cylindrical winding means interleaving with said first winding means and having a mean diameter equal to that of said first winding means and providing a magnetic field coaxial with, of substantially the same shape and intensity as, but of an opposite polarity to, that of said first means, and means for relatively axially moving said two winding means.

2. A composite adjustable inductance unit comprising a first substantially cylindrical winding means providing a magnetic field of predetermined shape, intensity, and polarity, a second substantially cylindrical winding means interleaving with said first winding means and having a mean diameter equal to that of said first winding means and providing a magnetic field coaxial with, of substantially the same shape and intensity as, but of an opposite polarity to, that of said first means, and means for relatively axially moving said two winding means from a first position in which said fields are substantially mutually exclusive to provide a maximum inductance to a second position in which said fields substantially coincide to provide a minimum inductance.

3. A composite adjustable inductance unit comprising a first substantially cylindrical winding means providing a magnetic field of predetermined shape, intensity, and polarity, a second substantially cylindrical winding means interleaving with said first winding means and having a mean diameter equal to that of said first winding means and providing a magnetic field coaxial with, of substantially the same shape and intensity as, but of an opposite polarity to, that of said first means, adjusting means for relatively axially moving said two winding means, control means for said adjusting means, and non-uniform motion-transmitting means connecting said control means and said adjusting means whereby equal adjustments of the former over its range of adjustment effect predetermined different relative movements of said winding means.

4. A composite adjustable inductance unit comprising a first substantially cylindrical winding means providing a magnetic field of predetermined shape, intensity, and polarity, a second substantially cylindrical winding means interleaving with said first winding means and having a mean diameter equal to that of said first winding means and providing a magnetic field of substantially the same shape and intensity as, but of an opposite polarity to, that of said first means, adjusting means for relatively moving said two winding means with a motion having a substantial axial component while maintaining the polarities of said fields substantially unchanged from a first position with the fields of said two winding means substantially mutually exclusive to a second position with the fields of said winding means substantially coincident, control means for said adjusting means, and non-uniform motion-transmitting means so connecting said control means and adjusting means that equal adjustments of said control means effect gradually decreasing relative movements as said windings are moved from said first position to said second position.

5. A composite adjustable inductance unit comprising a first substantially cylindrical winding means providing a magnetic field of predetermined shape, intensity, and polarity, a second substantially cylindrical winding means interleaving with said first winding means and having a mean diameter equal to that of said first winding means and providing a magnetic field of the same shape and intensity as, but of an opposite polarity to, that of said first means, said two winding means being coaxially disposed and dimensioned for telescopic movement, and means for relatively axially moving said winding means.

6. A composite adjustable inductance unit comprising a pair of relatively fixed substantially cylindrical windings providing a magnetic field of a predetermined shape, intensity, and polarity, an additional substantially cylindrical winding interleaving with said pair of windings and having a diameter equal to the mean diameter of said pair of windings and providing a magnetic field of substantially the same shape and intensity as, but of an opposite polarity to, that of said pair of windings, and means for axially moving said pair of windings and said additional winding relative to each other.

7. A composite adjustable inductance unit comprising a pair of relatively fixed coaxial substantially cylindrical windings one disposed within the other, an additional substantially cylindrical winding interleaving with said pair of windings and having a diameter equal to the mean diameter of said pair of windings and coaxially disposed with respect to said pair of windings and dimensioned for telescopic movement therebetween, and means for telescopically moving said pair of windings and said additional winding relative to each other from a substantially mutually exclusive position to provide maximum inductance to a position with said additional winding telescoped between the windings of said pair to provide minimum inductance.

8. A composite adjustable inductance unit comprising a pair of coaxial substantially cylindrical windings disposed one within the other and providing an annular space therebetween of a radial dimension which is a small fraction of the mean diameter of said windings, an additional winding coaxial with, and interleaving with, said pair of windings and dimensioned for telescopic movement therebetween, and means for relatively telescopically moving said pair of windings and said additional winding from a substantially mutually exclusive position providing maximum inductance to a position with said additional winding disposed in said annular space to provide minimum inductance.

9. A composite adjustable inductance unit comprising a first substantially cylindrical winding means, a second interleaving substantially cylindrical winding means, said two winding means having the same mean diameter and being coaxially disposed and dimensioned for telescopic engagement, and means for axially moving said two winding means, relative to each other, from a first position with said two winding means substantially mutually exclusive to provide a maximum inductance, to a second position with said two winding means telescopically disposed to provide a minimum inductance, the high potential ends of both winding means being substantially adjacent in the last-mentioned position.

10. A composite adjustable inductance unit comprising a first substantially cylindrical winding means providing a magnetic field of a predetermined shape, intensity, and polarity, a second substantially cylindrical winding means interleaving with said first winding means and having a mean diameter equal to that of said first winding means and connected in series with said first means, said two winding means providing a magnetic field coaxial with, of substantially the same shape and intensity as, but of an opposite polarity to, that of said first means, and means for relatively axially moving said two winding means.

11. A composite adjustable inductance unit comprising a first substantially cylindrical winding means providing a magnetic field of predetermined shape, intensity, and polarity, a second substantially cylindrical winding means interleaving with said first winding means and having a mean diameter equal to that of said first winding means and connected in parallel with said first means, said two winding means providing a magnetic field coaxial with, of substantially the same shape and intensity as, but of an opposite polarity to, that of said first means, and means for relatively axially moving said two winding means.

12. A composite adjustable inductance unit comprising a pair of substantially cylindrical windings connected in parallel and arranged to provide a magnetic field of a predetermined shape, intensity, and polarity, an additional interleaving substantially cylindrical winding connected in series with the windings of said pair and arranged to provide a magnetic field coaxial with, of substantially the same shape and intensity as, but of a polarity opposite to, that of said pair of windings, and means for relatively axially moving said pair of windings and said additional winding.

13. A composite adjustable inductance unit comprising a pair of concentric substantially cylindrical windings connected in parallel and providing a magnetic field of predetermined polarity, an additional interleaving substantially cylindrical winding connected in series and concentric with the windings of said pair and providing a magnetic field coaxial with, but of a polarity opposite to, that of the first said field, all of said windings being proportioned to have substantially the same inductance, and means for relatively axially moving said pair of windings and said additional winding from positions with said fields substantially mutually exclusive to positions with said fields substantially coincident.

14. A composite adjustable inductance unit comprising a pair of substantially cylindrical windings connected in series and arranged to provide a magnetic field of a predetermined shape, intensity, and polarity, an additional substantially cylindrical winding interleaving with said pair of windings and having a diameter equal to the mean diameter of said pair of windings and connected in series with the said pair of windings, said additional winding being arranged to provide a magnetic field coaxial with, of substantially the same shape and intensity as, but of a polarity opposite to, that of said pair of windings, and means for relatively axially moving said pair of windings and said additional winding.

15. A composite adjustable inductance unit comprising a pair of concentric substantially cylindrical windings connected in series, having substantially equal inductances and providing a magnetic field of predetermined polarity, an additional substantially cylindrical winding interleaving with said pair of windings and having a diameter equal to the mean diameter of said pair of windings and connected in series and concentric with the windings of said pair, having an inductance approximately four times that of each of the windings of said pair and providing a second magnetic field coaxial with, and of a polarity opposite to, that of the first said field, and means for relatively axially moving said pair of windings and said additional winding from positions with said field substantially mutually exclusive to positions with said fields substantially coincident.

16. A composite adjustable inductance unit comprising three coaxial cylindrical forms adapted to be telescoped one within another, the inner and outer forms being relatively fixed and having a mean diameter equal to that of the other of said forms, a winding disposed on each of said forms, said windings being connected in circuit and so dimensioned and disposed that the windings on the outer and inner forms provide a magnetic field of predetermined shape, intensity, and polarity and the winding on the intermediate form interleaves with the windings on the inner and outer forms and provides a magnetic field of substantially the same shape and intensity as, but of an opposite polarity to, that of said first field, and means for effecting relative movement between said outer and inner forms and said intermediate form.

17. A composite adjustable inductance unit comprising three coaxial cylindrical forms adapted to be telescoped one within another, the inner and outer forms being relatively fixed and having a mean diameter equal to that of the other of said forms, a winding disposed on each of said forms, said windings being connected in circuit and so dimensioned and disposed that the windings on the outer and inner forms provide a magnetic field of predetermined shape, intensity, and polarity and the winding on the intermediate form interleaves with the windings on the inner and outer forms and provides a magnetic field of substantially the same shape and intensity as, but of an opposite polarity to, that of said first field, a control element, and nonuniform motion-transmitting means connecting said element to said intermediate form, whereby equal adjustments of said element over its range of adjustment effect different movements of said intermediate form relative to said outer and inner forms.

18. A composite adjustable inductance unit comprising three coaxial cylindrical forms adapted to be telescoped one within another, the inner and outer forms being relatively fixed and having a mean diameter equal to that of the other of said forms, a winding disposed on each of said forms, said windings being connected in circuit and so dimensioned and disposed that the windings on the outer and inner forms provide a magetic field of predetermined shape, intensity, and polarity and the winding on the intermediate form interleaves with the windings on the inner and outer forms and provides a magnetic field of substantially the same shape and intensity as, but of an opposite polarity to, that of said first field, a control element, and nonuniform motion-transmitting means so connecting said element and said intermediate form that equal adjustments of said element over its range of adjustment effect gradually decreasing movements of said intermediate form relative to said outer and inner forms from a first position substantially external to said outer and inner forms to a second position substantially completely telescoped therebetween.

19. A composite adjustable inductance unit comprising a first substantially cylindrical winding means providing a magnetic field of predetermined shape, intensity and polarity, a second substantially cylindrical winding means adapted to interleave with said first winding means and movable relative to said first winding means so that at least portions thereof have a substantial axial component of movement with reference to the axis of said first winding means, said second winding means having a mean diameter equal to that of said first winding means and providing in one adjustment of the unit a magnetic field coaxial with, of substantially the same shape and intensity as, but of an opposite polarity to, that of said first means, and means for effecting relative movement between said two winding means from the positions corresponding to said one adjustment.

20. A composite adjustable inductance unit comprising, a pair of relatively fixed substantially cylindrical windings providing a magnetic field of a predetermined shape, intensity and polarity, an additional substantially cylindrical winding interleaving with said pair of windings and movable relative to said pair of windings so that at least portions thereof have a substantial axial component of movement with reference to the axis of said pair of winding means, said additional winding having a diameter equal to the mean diameter of said pair of windings and providing a magnetic field of substantially the same shape and intensity as, but of opposite polarity to, that of said pair of windings, and means for effecting relative movement between said pair of windings and said additional winding.

NELSON P. CASE.

CERTIFICATE OF CORRECTION.

Reissue No. 22,139. July 21, 1942.

NELSON P. CASE.

It is hereby certified that error appears in the printed specification of the above numbered patent requiring correction as follows: Page 4, second column, line 58, claim 8, before "winding" insert --substantially cylindrical--; page 5, second column, line 74, claim 18, for "magetic" read --magnetic--; and that the said Letters Patent should be read with this correction therein that the same may conform to the record of the case in the Patent Office.

Signed and sealed this 15th day of September, A. D. 1942.

Henry Van Arsdale,
Acting Commissioner of Patents.

(Seal)